United States Patent
Hanrahan

[11] Patent Number: 5,870,252
[45] Date of Patent: Feb. 9, 1999

[54] MAGNETIC HEAD SUSPENSION ASSEMBLY HAVING LOAD BEAM WITH HIGH RESONANT FREQUENCY AND SHOCK RESISTANCE

[75] Inventor: Kevin Patrick Hanrahan, Santa Barbara, Calif.

[73] Assignee: Read-Rite Corporation, Milpitas, Calif.

[21] Appl. No.: 693,408

[22] Filed: Aug. 7, 1996

[51] Int. Cl.$^6$ ........................................................ G11B 5/48
[52] U.S. Cl. .............................................................. 360/104
[58] Field of Search ............................................. 360/104

*Primary Examiner*—Stuart S. Levy
*Assistant Examiner*—Brian E. Miller
*Attorney, Agent, or Firm*—Nathan N. Kallman

[57] ABSTRACT

A load beam attached to an actuator arm of a magnetic head suspension assembly includes a base section, a midsection and an arm section. An air bearing slider is disposed at the distal end of the arm section. The midsection joins to the base section at a junction boundary which is wider than any of the other sections, and is also positioned at a distance away from the actuator arm. The load beam bends at the midsection starting at the junction boundary. The bending of the load beam allows the slider to fly proximally close to a disk surface during normal operation. The base section, secured to an actuator arm, is integrally formed with ribs. The base section provides a firm platform for the bending of the load beam and effectively shortens the effective length of the load beam, which affords higher vibrational resonant frequency. The suspension assembly also can sustain high shock separation impact.

7 Claims, 5 Drawing Sheets

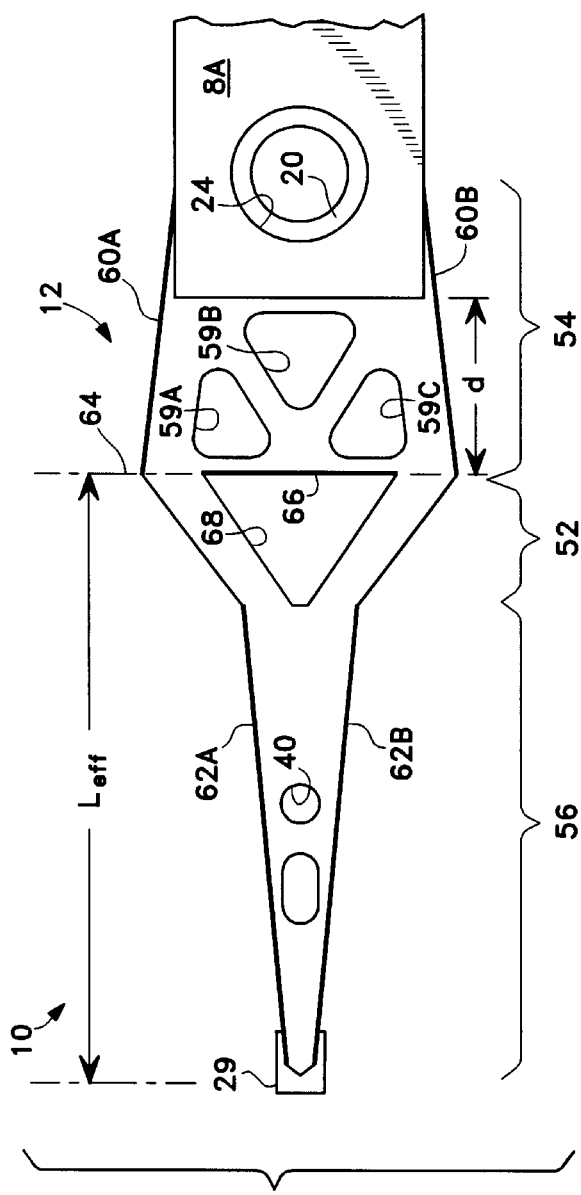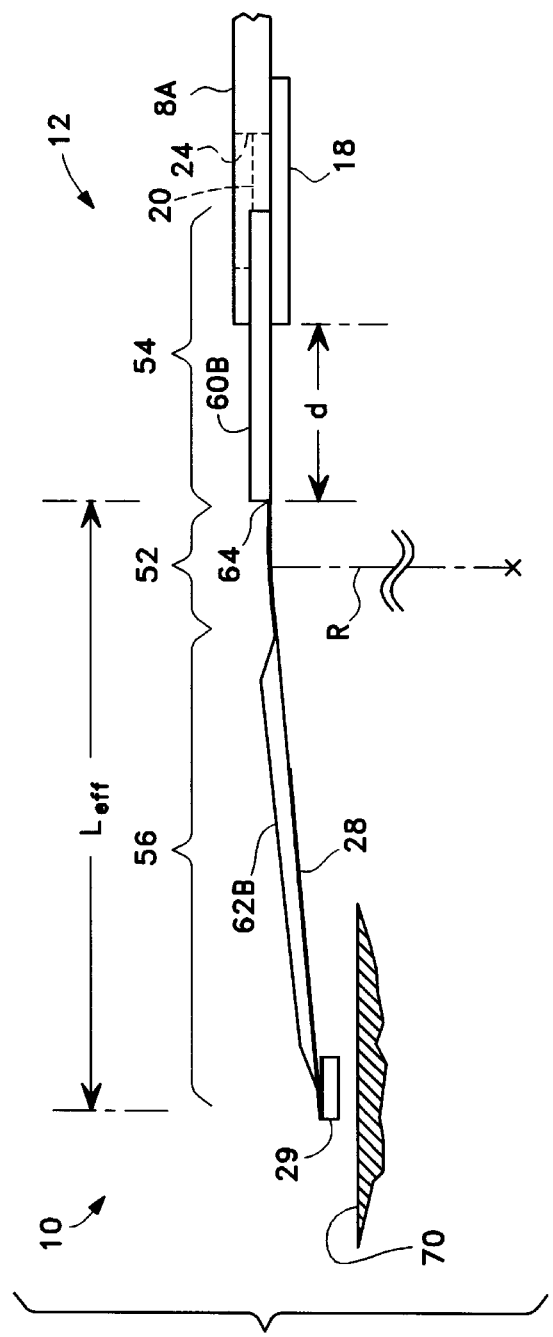
FIG. 3
FIG. 4

MAGNETIC HEAD SUSPENSION ASSEMBLY HAVING LOAD BEAM WITH HIGH RESONANT FREQUENCY AND SHOCK RESISTANCE

FIELD OF THE INVENTION

This invention relates to a thin film magnetic head assembly and in particular to a load beam structure of a magnetic head suspension assembly.

BACKGROUND OF THE INVENTION

Presently known magnetic disk drives are widely used for data storage. A disk drive includes one or more disks mounted on a spindle, and a head arm assembly for accessing data tracks on the disk during seek, write and read modes. The head arm assembly includes a load beam and a head gimbal assembly. The gimbal assembly comprises an air bearing slider pivotally attached to a flexure. A magnetic transducer for interacting with the storage disks, is supported by the slider.

During the data seeking mode for example, the disks spin at a high speed about the spindle. The aerodynamics between the slider and the disk surface provides sufficient buoyancy to the slider to fly above the disk surface. On the other hand, the spring force of the resilient load beam pushes the slider toward the disk surface. As a result, an equilibrium point is reached in which the slider flies over the disk surface at a very close spacing, which is the flying height of the slider.

A small flying height provides many advantages and is a major goal for most magnetic head suspension assembly designs. For example, data error is substantially reduced as data can be more reliably written onto or retrieved from the storage disks during the respective write and read modes. Also, the smaller flying height enables recording narrow data track widths, with resultant higher storage capacity.

There are problems associated with reducing the flying height of the slider. The topology of the disk surface, though highly polished, is not at all uniform at microscopic scale. Very often, the disk surfaces are not rotating about the common spindle at a perfectly perpendicular angle. A minute angular deviation would translate into variations in disk-to-slider distances while the disk is spinning. For reliable data writing and reading, the load beam must carry the slider in a manner that the slider can faithfully follow the topology of the disk surface through the thin air film separated the spinning disk and the slider. Accordingly, the magnetic head suspension assembly, including the load beam, must be sufficiently flexible to accommodate the uneven disk surface contour. The suspension assembly must also be reasonably robust to resist any physical deformation caused by the rapid movement of the actuator arm.

A rigidly built load beam is inflexible and is therefore ineffective to maintain a small flying height. On the other hand, a load beam made too flexible is more apt to resonate at a low frequency. Furthermore, a highly flexible load beam is more susceptible to deformation. A deformed load beam, would be prone to resonate at a still lower frequency and is detrimental to the performance of the magnetic head.

The problem of shock resistance is also of concern in the design of a magnetic head suspension. For a disk drive during the state of nonuse, the actuator arm is normally parked at a designated track on the disk surface. This is commonly called the "parking position" of the magnetic head. To reach the parking position, the actuator arm moves the slider above the parking track. The spinning disk then decelerates. The slider loses air buoyancy and slowly lands on the parking track. The slider rests on the parking track until the next takeoff for accessing tracks to read or write data or if it experiences mechanical shock. In the latter case, the impact of the shock would momentarily separates the slider from the disk surface. Thereafter, the slider will bounce back and collide with the disk surface caused mainly by the spring force of the load beam. The impact and bounce actions all happen within a short period of time. The collisions can damage the magnetic head and render the entire disk drive inoperable.

The shock is commonly called the "separation shock" and the unit of measure is in g's/gram where g is the gravitational acceleration in vacuum. A rigid load beam provides a higher separation shock. However, the flexibility and agility of the load beam are also compromised.

A typical prior art load beam described above is illustrated in FIGS. 5 and 6. A load beam with a narrow width is used to address the problem of resonant vibrations at low frequencies. The mass of the load beam is correspondingly reduced resulting in a load beam with higher resonant frequency. However, the problem with this approach is that the lateral stiffness of the load beam is also sacrificed. A load beam with low lateral stiffness is more vulnerable to deformation. Once the load beam is deformed, the resonant frequency is greatly reduced. Moreover, a narrow and elongated load beam, such as illustrated in FIGS. 7 and 8, cannot withstand a high separation shock.

SUMMARY OF THE INVENTION

It is an object of the invention to provide a magnetic head suspension assembly with a load beam that has a high resonant frequency of vibration.

It is another object of the invention to provide a magnetic head suspension assembly with a load beam that can withstand high separation shock.

It is a further object of the invention to provide a magnetic head suspension assembly with simplicity in design and reduced manufacturing cost.

In accordance with this invention, a magnetic head suspension assembly comprises a load beam which includes a base section, a midsection and an arm section. The midsection joins to the base section at a junction boundary which is wider than any of the other sections. The load beam is bent at the midsection starting at the junction boundary which is positioned at a predetermined distance away from the actuator arm of the suspension assembly. The bending of the load beam allows the slider to fly proximally close to a disk surface during normal operations. The base section is secured to and protrudes beyond the actuator arm and is formed with ribs. The base section provides a relatively firm platform for the bending of the midsection and practically shortens the effective length of the load beam. A load beam built in accordance with the invention yields a higher vibrational resonant frequency and is capable of withstanding higher shock impact.

These and other features and advantages of the invention will be apparent to those skilled in the art from the following detailed description, taken together with the accompanying drawings, in which like reference numerals refer to like parts.

BRIEF DESCRIPTION OF THE DRAWINGS

FIG. 3 is a top elevational view of the magnetic head suspension assembly shown in FIGS. 1 and 2;

FIG. 4 is a side elevation view of the magnetic head suspension assembly shown in FIGS. 1 and 2;

DETAILED DESCRIPTION OF THE INVENTION

Figure 1:
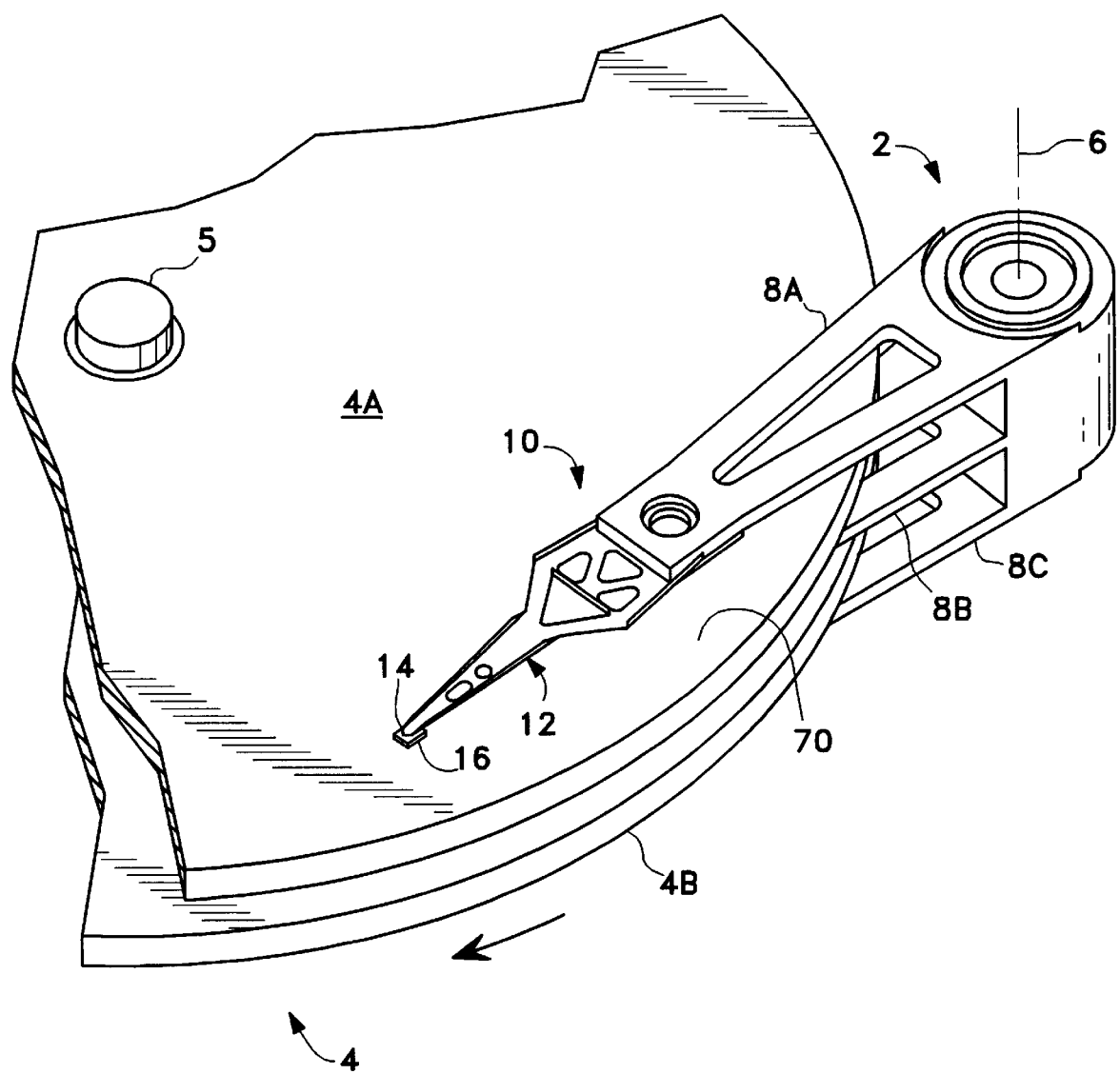
FIG. 1 is a fragmentary view of a disk drive having a magnetic head suspension assembly which includes the load beam in accordance with the invention.

Reference is now made to FIG. 1 which shows a fragmentary view of a disk drive having an actuator arm assembly 2 and a stack of spaced apart disks 4 revolvable about a common spindle 5. The actuator arm assembly 2 is rotatable about an actuator arm axis 6. The arm assembly 2 includes a plurality of actuator arms 8A–8C which extend into the spacings between the disks 4A and 4B. Attached to each of the actuator arms 8A–8C is a magnetic head suspension assembly 10, which comprises a resilient load beam 12, a flexure 14 and a slider 16.

Figure 2:
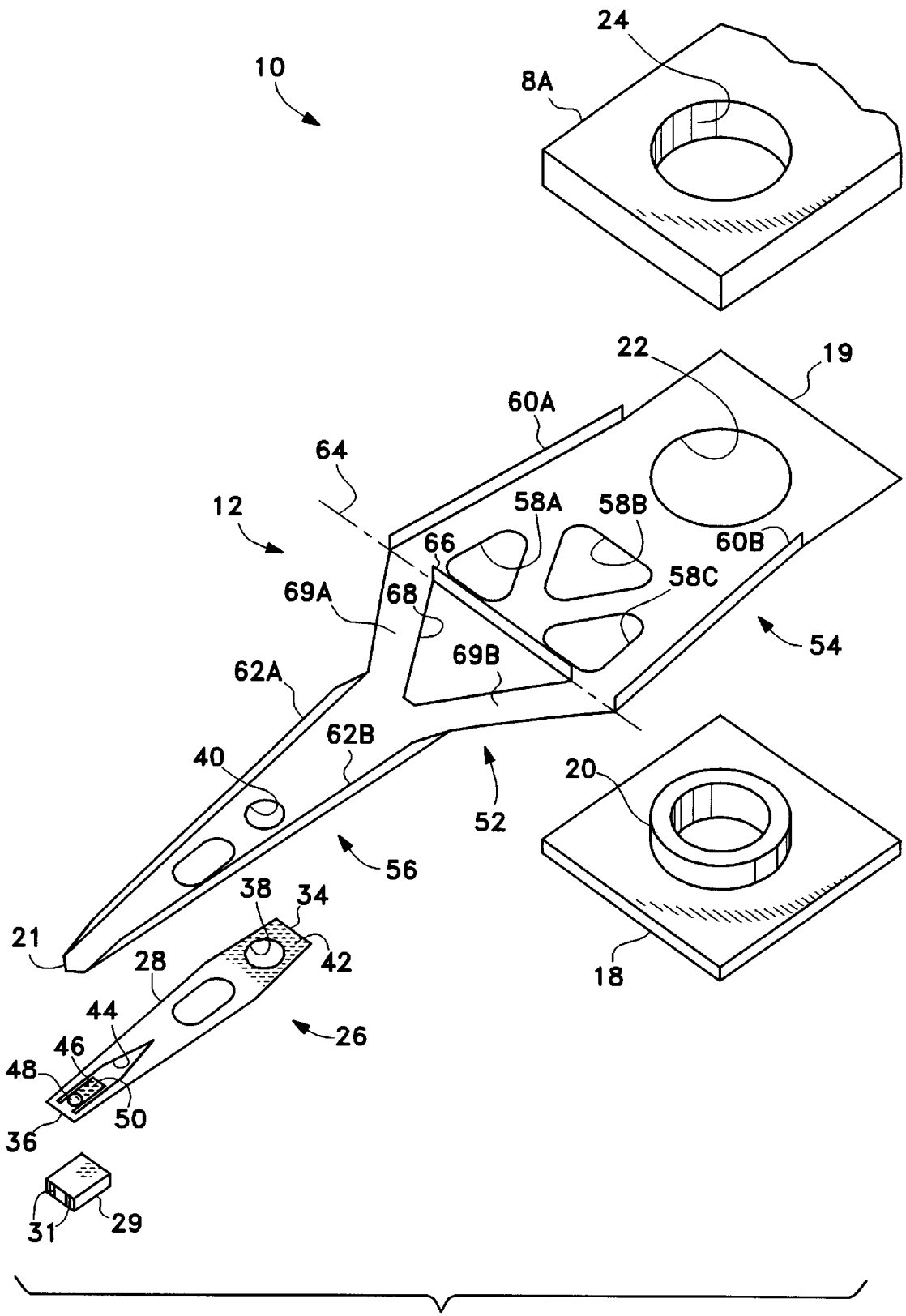
FIG. 2 is an enlarged and exploded view of the magnetic head suspension assembly shown in FIG. 1.

FIG. 2 is an exploded view which shows the magnetic head suspension assembly 10 in further detail. The load beam 12 has a proximal end 19 and a distal end 21. The proximal end 19 of the load beam 12 is sandwiched between a base plate 18 and the actuator arm 8A. Protruding from the base plate 18 is a boss 20 insertable into the respective holes 22 and 24 of the load beam 12 and the actuator arm 8A. The load beam 12 is tightly secured to the actuator arm 8A. At the distal end 21 of the load beam 12 is a head gimbal assembly 26 which includes a flexure 28 and a slider 29. Magnetic transducers 31 are disposed on the edge wall of the slider 29. The flexure 28 is made of flexible material and has a proximal end 34 and a distal end 36. At the proximal end 34 of the flexure 28 is an alignment hole 38 which aligns with a corresponding hole 40 in the load beam 12. The flexure 28 is attached onto the bottom surface of the load beam 12 by gluing or soldering. The area of attachment is represented by a hatched area as attachment portion 42 shown in FIG. 2. At the distal end 36 of the flexure 28 is a cutout 44. A finger portion 46 protrudes into the cutout 44. Stamped on the finger portion is a dimple 48. There is also another attachment portion 50, represented by another hatched area in FIG. 2 at the finger portion 46. The attachment portion 50 at the bottom of the finger portion 46 is glued to the top surface of the slider 29. During normal operations, the dimple 48 is urged against the bottom of the load beam 12. In conjunction with the aerodynamics of the moving air underneath the slider 29, the flexure 28 and the slider 29 provide much of the gimbaling action.

The load beam 12 includes a midsection 52 integrally disposed between a base section 54 and an arm section 56. The base section 54 has a plurality of cutouts 58A–58C, which reduces the overall mass of the load beam 12. In this embodiment, there is a pair of ribs 60A and 60B formed on both edges of the base section 54. The ribs 60A and 60B provide rigidity to the load beam 12.

The arm section 56 is elongated in shape and includes another pair of ribs 62A and 62B. The elongated arm section 56 is made with a narrow width that substantially reduces the mass of the load beam 12. As a consequence, both shock durability and vibrational frequency are improved. The ribs 62A–62B are tapered toward the distal end 21. The tapering of the ribs 62A and 62B also serves the purpose of mass reduction without any substantial compromise in rigidity.

The midsection 52 meets the base section 54 at a junction boundary 64 designated by a dashed line which is wider than any other sections of the load beam 12. The wide junction boundary 64 provides lateral stiffness to the load beam 12. There is also a transverse rib 66 disposed across a central cutout 68 to reinforce the overall plate stiffness of the load beam 12 and increase the first torsional resonant frequency. The central cutout 68 defines two strut members 69A and 69B which are slightly tapered in proportion to the lateral bending each strut member moment must bear and equally share the bending stress across the midsection 52. The central cutout 68 reduces the mass of the load beam 12 and also improves the roll and pitch of the beam 12.

FIGS. 3 and 4 are respectively the top plan view and side elevational views of the magnetic head suspension assembly 10 shown in FIG. 2. As mentioned before, the base section 54 of the load beam 12 is partially but tightly secured between the base plate 18 and the actuator arm 8A. Coupled with the ribs erected on both sides of the base section 60A and 60B, the base section 54 forms a relatively robust platform. However, the base section 54 with the cutouts 59A–59C still provides a certain degree of flexibility for assisting the roll and pitch parameters of the overall suspension 10. In operation, the load beam 12 bends at the midsection 52 allowing the distal end 29 of the load beam 12 carrying the slider 29 to fly proximally close to the disk surface 70.

The bend of the load beam 12 starts at the junction boundary 64 which is located at a distance d away from the actuator arm 8A. The bend section 52 is somewhat arcuate in shape and has a radius of curvature R (FIG. 4). In essence, the arm section 56 can be positioned at any angular relationship with respect to the disk surface 70 by bending the midsection 52 at the boundary 64. In accordance with the invention, by moving forward the point of bending, instead of bending at a location closer to the proximal end 19, the effective length $L_{off}$ of the load beam is practically shortened. In a simple cantilever assembly, the resonant frequencies of various modes of vibration are inversely proportional to the square root of the mass per unit length of the beam. The same resonant frequencies are also inversely proportional to the square of the effective length. It is seen that the resonant frequencies of the load beam are more dependent on its effective length than other parameters. By reducing the effective length $L_{off}$ of the load beam 12, the resonant frequency is significantly increased.

In addition, the shock separation performance of the load beam 12 is also improved. When the slider 29 is at its parking position, the moment provided by the spring force of the load beam 12 presses the slider 29 against the disk surface 70. The moment provided by the load beam 12 comes mainly from the elasticity of the beam 12. If the elasticity of the load beam 12 remains constant, with a shorter effective length $L_{off}$ of the load beam, the spring force pressing the slider 29 against the disk surface 70 increases. It follows that any separation force, such as impact force, the need to separate the slider 29 and the disk surface 70 is larger. Solving the problem of shock separation through shortened effective length $L_{off}$, instead of actual length, of the load beam 12 minimally impacts other parameters, such as the roll and pitch, of the beam 12.

Figure 5:
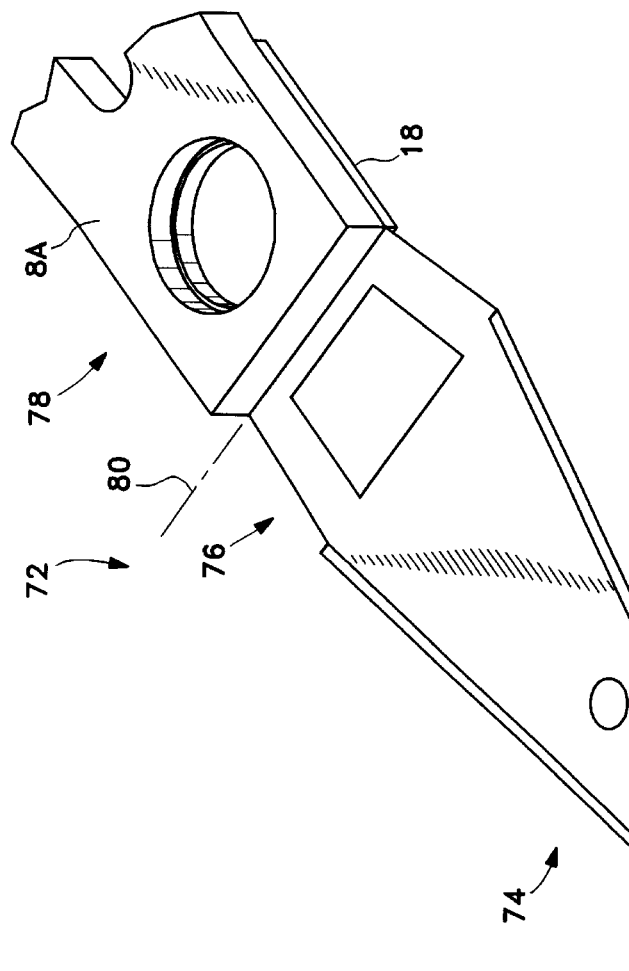
FIG. 5 is an isometric view of a prior art magnetic head suspension assembly.
Figure 6:
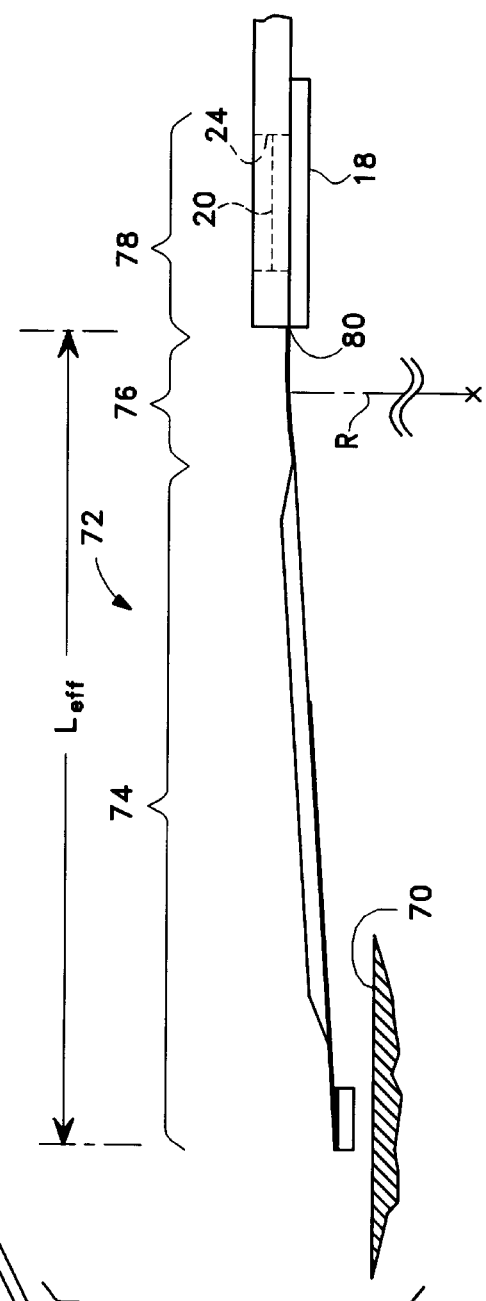
FIG. 6 is s side elevational view of the prior art magnetic head assembly shown in FIG. 5.

The load beam 12 of this invention should be contrasted with a typical prior art load beam 72 as shown in FIGS. 5 and 6. FIG. 5 is an isometric view of the load beam 72 which includes an arm section 74 joined to a midsection 76. There is also a base section 78 fully embedded within the actuator arm 8A and the base plate 18. The midsection 76 and the base section 78 meet at a junction boundary 80 which coincides with the edge of the actuator arm 8A. The load beam 72 starts to bend at the boundary 80 and arcs at the midsection 76 with a radius of curvature R. As a practical matter, in order to reach the disk surface 70, the physical length of the load beam 72 must be elongated. The effective length $L_{off}$ of the beam 72, which is equal to the exposed length of the beam 72 in this case, is accordingly lengthened. To maintain the lateral stiffness, the junction boundary 80 of the midsection 76 and the arm section 74 are also broadened. A load beam with a long effective length $L_{off}$ does not possess the advantageous attributes of the inventive load beam 12 as discussed above. Furthermore, the broadened arm section 74 starting from the junction boundary 80 also correspondingly increases the mass of the load beam 72 which renders the beam 72 more susceptible to vibration.

Figure 7:
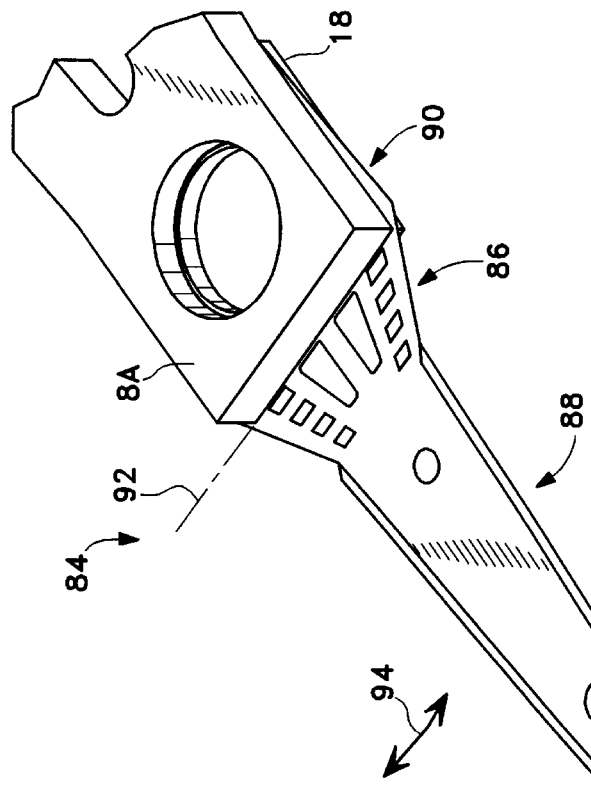
FIG. 7 is a isometric view of another prior art magnetic head suspension assembly.
Figure 8:
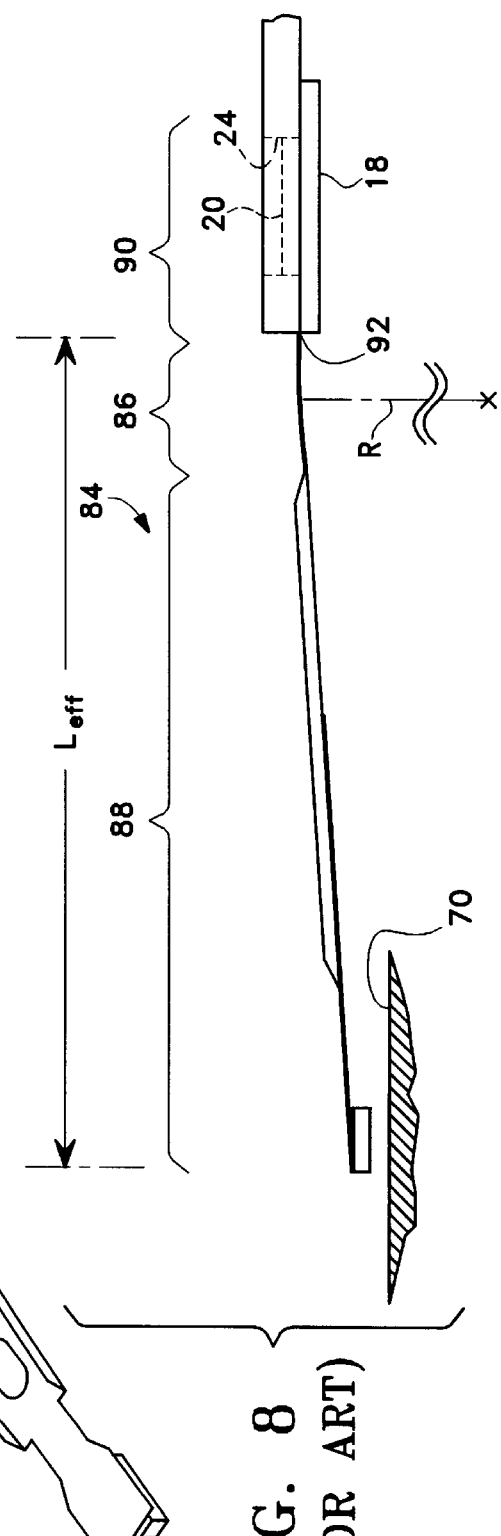
FIG. 8 is s side elevational view of the prior art magnetic head suspension assembly shown in FIG. 7.

FIGS. 7 and 8 show another prior art load beam 84 which includes a midsection 86 disposed between an arm section 88 and a base section 90. The base section 90 is fully sandwiched between the base plate 18 and the actuator arm 8A. In fact, the load beam 84 of FIGS. 7 and 8 is not much different in structural design in comparison with the load beam 72 of FIGS. 5 and 6. Specifically, the midsection 86 and the base section 90 meet at a junction boundary 92 which coincides with the edge of the actuator arm 8A. The load beam 84 starts to bend at the boundary 92 of the midsection 86 with a radius of curvature R. The effective length $L_{off}$ of the load beam 84 is also equal to the exposed physical length of the beam 84. The only difference is the arm section 88 of the beam 84 is narrower in width than the corresponding arm section 74 of the beam 72, shown in FIGS 5 and 6. The narrower width of the arm section 88 reduces the mass of the beam 84 and consequently raises the vibrational frequency. However, the higher vibrational frequency is gained at a sacrifice of lower lateral stiffness. That is, the load beam 84 is more vulnerable to physical deformation under the rapid sweeping movements of the actuator arm 8A in the directions designated by bidirectional arrow 94. As with the load beam 72 shown in FIGS. 5 and 6, the longer effective length $L_{off}$ of the beam 84 also subjects the beam 84 to be more susceptible to resonant vibration at a lower frequency and less endurable to impact shock.

Extensive modeling has been conducted on the load beams 72 and 84 as described above, and the load beam 12 in accordance with the invention. The modeling results are tabulated as follows:

|  | Load Beam 72 (Prior Art) | Load Beam 84 (Prior Art) | Load Beam 12 (Invention) |
| --- | --- | --- | --- |
| First Torsional Frequency in Hz. | 4454 | 4804 | 5077 |
| Shock Separation in g's/gram | 220 | 295 | 308 |

As can be seen from the chart, the load beam of the invention yields a higher first torsional frequency, which is the most commonly encountered vibrational mode in a magnetic head suspension assembly. There is also at least a 25% improvement in shock separation compared to the prior art load beams. Without any special tooling, adopting the design of the invention provides a novel magnetic head assembly capable of withstanding higher mechanical vibrations and being more resistant to shock impact.

Other variations are possible within the scope of the invention. For example, any of the cutouts, such as the central cutout 68 or the base section cutouts 58A–58C can be eliminated, and the load beam 12 can still substantially maintain its performance. Furthermore, the transverse rib 66 can be modified, or alternatively, another transverse rib other than the rib 66 can be added to the midsection 52. These and other changes in form and detail may be made therein without departing from the scope and spirit of the invention.

What is claimed is:

1. A magnetic head suspension assembly for interacting with a recording medium comprising:

a load beam having a proximal end and a distal end;

a base section having an attachment hole at said proximal end and a plurality of cutouts other than said attachment hole, said cutouts being triangular in shape and positioned to define a triangular pattern, said base section including vertical ribs at its periphery for providing rigidity and no other vertical ribs projecting therefrom or from said cutouts;

an elongated arm section including a plurality of ribs for providing rigidity; and a midsection formed between said base and arm sections, said midsection and said base section defining therebetween a junction boundary, said base section extending from said proximal end to said junction boundary, wherein two of said triangular cutouts each have a side substantially coincident with said junction boundary;

an actuator arm and a base plate between which a portion only of said base section is sandwiched, the remaining portion of said base section extending to said junction boundary;

so that said suspension assembly is characterized by an increased vibrational resonant frequency and resistance to shock impact and physical deformation.

2. The magnetic head suspension assembly as set forth in claim 1 each of said base and arm sections respectively decreasing in width from said junction boundary toward said proximal and distal ends.

3. A magnetic head suspension assembly for interacting with a magnetic recording medium comprising:

a load beam having a proximal end and a distal end, said load beam being formed with a base section, a midsection, and a narrow elongated arm section;

a junction boundary defining the boundary between said base section and said midsection;

a transverse rib disposed collinearly with said junction boundary;

said base section extending from said proximal end to said transverse rib and said junction boundary, said base section having an attachment hole at said proximal end and a plurality of cutouts other than said attachment hole, said cutouts being triangular in shape and positioned to define a triangular pattern, said base section including vertical ribs at its periphery and no other vertical ribs projecting therefrom or from said cutouts;

a pair of coplanar linear struts without any bends, disposed in the same plane as said base section and said arm section, said struts forming said midsection and extending from said junction boundary and respectively from said pair of side ribs of said base section and converging towards said arm section to define a single triangular cutout therebetween; and a pair of side ribs extending from said junction boundary along the sides of said arm section towards said distal end, said arm section having no other ribs formed therewith.

4. The magnetic head suspension assembly as set forth in claim 3 wherein said arm section includes tapered ribs for providing rigidity.

5. The magnetic head suspension assembly as set forth in claim 3 further including an air bearing slider and a flexure, said air bearing slider being attached to said flexure which is attached at the distal end of said arm section.

6. The magnetic head suspension assembly as set forth in claim 3, said junction boundary being wider than any of said sections.

7. A head suspension assembly as in claim 3, including an actuator arm for attaching said load beam to an actuator for accessing data tracks on said medium;

a base plate for attaching said base section to said actuator arm, said actuator arm and said base plate being spaced from said junction boundary;

the base section of said load beam being partially sandwiched between said base plate and said actuator arm, the remaining portion of said base section being disposed between said junction boundary and said actuator arm;

so that said load beam is bent at said midsection starting at said junction boundary, said base section providing a firm platform for the bending of said midsection.

* * * * *